United States Patent [19]

Yukawa et al.

[11] Patent Number: 5,274,045

[45] Date of Patent: * Dec. 28, 1993

[54] SELF-CROSSLINKABLE RESIN

[75] Inventors: Yoshiyuki Yukawa, Hiratsuka; Motoshi Yabuta, Hatano; Yasushi Nakao, Hiratsuka, all of Japan

[73] Assignee: Kansai Paint Company, Limited, Amagasaki, Japan

[*] Notice: The portion of the term of this patent subsequent to May 26, 2009 has been disclaimed.

[21] Appl. No.: 842,565

[22] Filed: Feb. 27, 1992

[30] Foreign Application Priority Data

Mar. 4, 1991 [JP] Japan .................................. 3-37166

[51] Int. Cl.$^5$ .............................................. C08G 18/80
[52] U.S. Cl. .................................. 525/293; 525/328.2; 525/374; 525/383; 525/384; 528/44; 528/45; 526/310; 526/312
[58] Field of Search ...................................... 525/293

[56] References Cited

U.S. PATENT DOCUMENTS

| | | | |
|---|---|---|---|
| 4,153,775 | 5/1979 | Winkelmann et al. | 528/45 |
| 4,284,572 | 8/1981 | Stanley et al. | 260/347.4 |
| 4,456,740 | 6/1984 | Holubka et al. | 525/528 |
| 4,614,761 | 9/1986 | Takiyama et al. | 525/59 |
| 4,659,795 | 4/1987 | Tsutsui et al. | 526/301 |
| 4,794,154 | 12/1988 | Benefiel | 528/45 |
| 4,861,853 | 8/1989 | Petrie et al. | . |
| 4,983,676 | 1/1991 | Petrie et al. | 525/107 |
| 5,116,930 | 5/1992 | Yabura et al. | 528/45 |

FOREIGN PATENT DOCUMENTS 0051476 5/1982 European Pat. Off. .
2621040 3/1989 France .

OTHER PUBLICATIONS

Database WPIL, NO88-254739, Derwent Publications Ltd., London, GB; & JP-A-63,186,722 (Takeda Chemical Ind KK) Aug. 2, 1988.

*Primary Examiner*—James J. Seidleck
*Assistant Examiner*—Patrick R. Delaney
*Attorney, Agent, or Firm*—Armstrong, Westerman, Hattori, McLeland & Naughton

[57] ABSTRACT

A self-crosslinkable resin useful as, for example, adhesive compositions and coating compositions. The resin contains complementary reactive groups, that is, a blocked isocyanate group and a hydroxyl group, in the same molecule. The resin is prepared by reacting a hydroxy-containing vinyl monomer with some isocyanate groups on the skeleton of a vinyl polymer having at least two isocyanate groups in the molecule so to introduce a polymerizable double bond into the polymer, and subsequently completely blocking the isocyanate group(s) remaining on the polymer skeleton with a blocking agent, or vice versa. Thereafter an unsaturated monomer component consisting essentially of a hydroxyl-containing vinyl monomer is polymerized with the polymerizable double bond introduced.

9 Claims, No Drawings

SELF-CROSSLINKABLE RESIN

The present invention relates to novel self-crosslinkable resins which are useful for adhesive compositions, coating compositions and the like and wherein complementary reactive groups, i.e., a blocked isocyanate group and a hydroxyl group, are conjointly present in the same molecule.

Coating compositions of the two-pack type or single-pack type comprising an acrylic polyol or like hydroxyl-containing polymer and a polyisocyanate crosslinking agent for curing the polymer form coatings which, when cured, exhibit excellent properties including high resistance to chemicals and weather and have found wide use, for example, as coating compositions for motor vehicles.

However, such compositions of the two-pack type have safety and hygienic problems which are encountered when the isocyanate crosslinking agent is admixed with the other component or when the composition is used for coating. These compositions have the defect of being short in pot life (usable period of time) after the two components have been mixed together for application, permitting an increase in viscosity during coating or entailing difficulty in washing the coating device. The compositions of the single-pack type are not always satisfactory in the compatibility of blocked isocyanate serving as the crosslinking agent with acrylic polyol as the base resn. Even if the agent is compatible with the resin, the cured coating obtained differs in composition between the surface and the interior when microscopically observed and has the defect of being inferior in curability, gloss and surface smoothness.

To obviate these defects, Unexamined Japanese Patent Publication No. 186722/1988 discloses a self-crosslinkable resin which is prepared by copolymerizing a hydroxyl-containing polymerizable monomer with a polymerizable monomer containing an isocyanate group or blocked isocyanate group and which is made to contain complementary reactive groups in the molecule.

However, the preparation of the resin involves problems. The disclosed process of preparation encounters difficulty in preventing a reaction between isocyanate and hydroxyl and thus permits gelation during the copolymerization reaction between a radically polymerizable monomer containing an unblocked isocyanate group and a hydroxyl-containing radically polymerizable monomer even if the reaction is conducted at the lowest possible temperature. Further when the process is considered in connection with polymerization initiators, azo initiators fail to achieve a satisfactory polymerization conversion since the isocyanate-containing monomer disclosed in the publication is a derivative of $\alpha$-methylstyrene, while use of peroxide or carbonate initiators requires a high temperature of at least 100° C. when a high polymerization conversion is to be attained.

On the other hand, use of blocked isocyanate-containing polylmerizable monomers is less likely to permit gelation during the polymerization reaction, whereas use of the disclosed $\alpha$-methylstyrene derivative, which is to be polymerized at a temperature of at least 100° C. as stated above, results in the defect of causing marked discoloration during the polymerization reaction if the isocyanate of the derivative is blocked with a phenolic or oxime blocking agent. Other blocking agents have a high dissociation temperature, therefore require heating at a high temperature (at least 170° C.) for curing the self-crosslinkable resin obtained and present difficulties in providing resins which are curable at low temperatures (e.g., up to 120° C.).

An object of the present invention is to provide a novel self-crosslinkable resin which is free of the foregoing problems of the prior art.

Another object of the invention is to provide a self-crosslinkable resin which has a blocked isocyanate group and a hydroxyl group in the same molecule and which can be prepared without permitting gelation, discoloration or a reduction in polymerization conversion and can also made curable at a low temperature.

These and other objects of the present invention will become apparent from the following description.

The present invention provides:

(1) a self-crosslinkable resin characterized in that the resin is prepared by reacting a hydroxyl-containing vinyl monomer with some isocyanate groups on the skeleton of a vinyl polymer having at least two isocyanate groups in the molecule to introduce a polymerizable double bond into the polymer, subsequently completely blocking the isocyanate group(s) remaining on the polymer skeleton with a blocking agent, and thereafter polymerizing an unsaturated monomer component consisting essentially of a hydroxyl-containing vinyl monomer with the polymerizable double bond introduced; and (2) a self-crosslinkable resin characterized in that the resin is prepared by blocking some isocyanate groups on the skeleton of a vinyl polymer having at least two isocyanate groups in the molecule with a blocking agent, subsequently reacting a hydroxyl-containing vinyl monomer with the isocyanate group(s) remaining on the polymer skeleton to introduce a polymerizable double bond into the polymer, and thereafter polymerizing an unsaturated monomer component consisting essentially of a hydroxyl-containing vinyl monomer with the polymerizable double bond introduced.

We have conducted intensive research in order to overcome the foregoing problems of the prior art and found that a self-crosslinkable resin can be prepared by reacting a hydroxy-containing vinyl monomer with some isocyanate groups on the skeleton of a vinyl polymer having at least two isocyanate groups in the molecule to introduce a polymerizable double bond into the polymer, subsequently completely blocking the isocyanate group(s) remaining on the polymer skeleton with a blocking agent; or blocking some isocyanate groups on the polymer skeleton with a blocking agent, subsequently reacting a hydroxyl-containing vinyl monomer with the isocyanate group(s) remaining on the polymer skeleton to introduce a polymerizable double bond into the polymer; and thereafter polymerizing an unsaturated monomer component consisting essentially of a hydroxyl-containing vinyl monomer with the polymerizable double bond introduced. The resin can be prepared without gelation or discoloration during the polymerization reaction and without resulting in a reduction in polymerization conversion, and has a blocked isocyanate group and a hydroxyl group, which are complementary reactive groups, in the same molecule. We have further found that the self-crosslinkable resin can be made curable at a low temperature.

The present invention has been accomplished based on these novel findings.

The vinyl polymer having at least two isocyanate groups in the molecule (hereinafter referred to briefly as "NCO-containing polymer") for use in the present invention is a polymer consisting essentially of an isocyanate-containing vinyl monomer (hereinafter referred to briefly as "NCO-containing monomer) and further comprising, when required, other vinyl monomers. The polymer has a structure wherein isocyanate groups are attached to a terminal end and/or a side chain of a straight-chain polymer.

The NCO-containing monomer is a compound having at least one unblocked isocyanate group and at least one radically polymerizable double bond in the molecule. Examples of such compounds are methacryloyl isocyanate, 2-isocyanate-ethyl methacrylate, m- or p-isopropenyl-$\alpha$, $\alpha'$-dimethylbenzylisocyanate or adducts of a diisocyanate compound with hydroxyl-containing vinyl monomer in the mole ratio of 1:1. At least one of these compounds is used.

The hydroxyl-containing vinyl monomer for use in preparing NCO-containing monomers is a compound having at least one hydroxyl group and at least one radically polymerizable double bond in the molecule. Examples of such compounds are 2-hydroxyethyl (meth)acrylate, 2-hydroxypropyl (meth)acrylate, hydroxybutyl acrylate, 2,3-dihydroxypropyl acrylate, 2-hydroxy-3-phenoxyethyl acrylate, 2-hydroxy-3-ethoxyethyl acrylate and the like. Also useful are equimolar adducts of acrylic acid or methacrylic acid with a glycol (having 2 to 20 carbon atoms).

The diisocyanate compound for use in preparing NCO-containing monomers is one having two isocyanate groups in the molecule. Examples of such compounds are aliphatic, aromatic and alicyclic diisocyanate compounds including tolylene diisocyanate, 4,4'-diphenylmethane diisocyanate, xylene diisocyanate, hexamethylene diisocyanate, lysine diisocyanate, 4,4'-methylenebis-(cyclohexyl isocyanate), methylcyclohexane-2,4(2,6)-diisocyanate, isophorone diisocyanate and trimethylhexane diisocyanate.

Especially preferred NCO-containing monomers are 2-isocyanateethyl methacrylate, m-isopropenyl-$\alpha,\alpha'$-dimethylbenzyl isocyanate or equimolar adduct of isophorone diisocyanate with 2-hydroxyethyl acrylate.

The NCO-containing polymer is obtained by polymerizing such an NCO-containing monomer only or copolymerizing the monomer with other vinyl monomer.

The other vinyl monomer mentioned is preferably a compound having a radically polymerizable double bond in the molecule but having no active hydrogen reactive with the isocyanate group. Examples of such compounds are styrene, $\alpha$-methylstyrene, vinyltoluene and like aromatic vinyl monomers; methyl (meth)acrylate, ethyl (meth)acrylate, butyl (meth)acrylate, 2-ethylhexyl (meth)acrylate, lauryl (meth)acrylate, tridecyl (meth)acrylate, stearyl (meth)acrylate, cyclohexyl (meth)acrylate, benzyl (meth)acrylate and like (meth)acrylic acid esters; Biscose-3F, -3MF, -8F and -8MF (brand names of products of Osaka Organic Chemical Industry LTD.), perfluorocyclohexyl (meth)acrylate, N-2-propylperfluorooctanesulfonic amide, ethyl (meth)acrylate, vinyl fluoride, vinylidene fluoride and like fluorine-containing vinyl monomers; N,N'-dimethylaminoethyl (meth)acrylate, N,N'-diethylaminoethyl (meth)acrylate, N,N'-dibutylaminoethyl (meth)acrylate, N,N'-diethyl (meth)acrylamide and like nitrogen-containing vinyl monomers; vinyl ethyl ether, vinyl butyl ether and like vinyl ether monomers; and glycidyl (meth)acrylate, 3,4-epoxycyclohexylmethyl (meth)acrylate, aryl glycidyl ether, alkyl-etherified product of methylolacrylamide, (meth)acrylamide, (meth)acrylic acid chloride, vinyl chloride, vinylidene chloride, (meth)acrylonitrile, $\gamma$-methacryloxyalkyltrimethoxysilane, etc. One of these compounds or a mixture of at least two of them is used.

Although the ratio of the NCO-containing monomer to other vinyl monomer is not limited specifically insofar as the NCO-containing polymer has at least two free isocyanate groups in the molecule, the ratio of NCO-containing monomer/other vinyl monomer (by weight) is suitably in the range of 100/0 to 1/99, preferably 100/0 to 10/90.

The polymerization reaction of the NCO-containing monomer or of this monomer with other vinyl monomer is conducted preferably in an inert organic solvent usually free from active hydrogen. The inert organic solvent free from active hydrogen means such a solvent not having any active hydrogen which is reactive with the isocyanate group. Examples of useful solvents are hexane, heptane, octane and like aliphatic hydrocarbon solvents, benzene, toluene, xylene and like aromatic solvents, ester solvents, ketone solvents, etc. These solvents are used singly or in mixture. Since some of these solvents contain water, it is desirable to dehydrate the solvent before use when required.

The polymerization reaction is carried out usually at a temperature of 50° to 180° C. in the presence of a radical polymerization initiator. The molecular weight of the polymer is controllable by varying the concentration of the reaction mixture, the amount of initiator, etc. The concentration is variable over the range of 20 to 80 wt. % in terms of the concentration of the resulting polymer.

Examples of radical polymerization reaction initiators to be used are benzoyl peroxide, lauroyl peroxide, caproyl peroxide, tert-butyl peroctoate, diacetyl peroxide and like organic peroxides; $\alpha,\alpha'$-azobisisobutyronitrile, $\alpha,\alpha'$-azobis-$\alpha,\gamma$-dimethylvaleronitrile, dimethyl-$\alpha,\alpha'$-azoisobutyrate and like azo catalysts; diisopropylperoxy carbonate, tert-butyl peroxyisopropyl carbonate and like dialkyl peroxy dicarbonates; and redox initiators. While the polymerization initiator is usable at a concentration of 0.01 to 15 wt. % based on the whole amount of monomer(s), the preferred amount is in the range of 0.1 to 10 wt. %.

The polymerization reaction can be conducted using an electron beams, ultraviolet rays or the like in place of the initiator.

Alternatively ion polymerization or group transfer polymerization can be resorted to instead of radical polymerization.

When m-isopropenyl-$\alpha,\alpha'$-dimethylbenzyl isocyanate is used as the NCO-containing monomer for the polymerization reaction, it is desirable to conduct the reaction at a temperature of at least 100° C. using a peroxide or carbonate initiator to achieve an improved polymerization conversion. It is more desirable to use an acrylate monomer in combination with this monomer, whereby a polymer of higher polymerization conversion can be readily obtained.

The NCO-containing polymer thus prepared for use in the present invention has a weight average molecular weight of about 500 to about 50,000, preferably 1,000 to 30,000. The NCO-containing polymer, which has at least two free isocyanate groups in the molecule, is preferably free from any active hydrogen reactive with the isocyanate group.

The self-crosslinkable resin of the present invention is prepared, for example, by a process A or process B as will be described below.

The process A comprises reacting a hydroxyl-containing vinyl monomer with some isocyanate groups on the skeleton of the NCO-containing polymer to introduce a polymerizable double bond into the polymer, subsequently completely blocking the isocyanate group(s) remaining on the polymer skeleton with a blocking agent, and thereafter polymerizing an unsaturated monomer component consisting essentially of a hydroxyl-containing vinyl monomer with the polymerizable double bond introduced.

The process B comprises blocking some isocyanate groups on the skeleton of the NCO-containing polymer with a blocking agent, subsequently reacting a hydroxyl-containing vinyl monomer with the isocyanate group(s) remaining on the polymer skeleton to introduce a polymerizable double bond into the polymer, and thereafter polymerizing an unsaturated monomer component consisting essentially of a hydroxyl-containing vinyl monomer with the polymerizable double bond introduced.

Suitable hydroxyl-containing vinyl monomers for use in the processes A and B are those previously exemplified for the preparation of the NCO-containing polymer.

The reaction between the NCO-containing polymer and the hydroxyl-containing vinyl monomer in the process A is a urethanation reaction between the isocyanate group and the hydroxyl group. Stated more specifically, this reaction is conducted by admixing the hydroxyl-containing vinyl monomer with a solution of the NCO-containing polymer in an organic solvent at a temperature usually of 40° to 100° C. When required, tin compound or like catalyst may be used in this reaction. The hydroxyl-containing vinyl monomer is used in an amount corresponding to at least 0.1 polymerizable double bond per molecule, about 500 to about 50,000 in weight average molecular weight, of the NCO-containing polymer, preferably 0.5 to 1.5 polymerizable double bonds per molecule having a weight average molecular weight of 1,000 to 30,000. It is most preferable to introduce 1 polymerizable double bond into the NCO-containing polymer per molecule thereof.

Subsequently in the process A, a blocking agent is reacted with the free isocyanate group(s) remaining in the NCO-containing polymer reacted with the hydroxyl-containing vinyl monomer and having the polymerizable double bond introduced therein to completely block the remaining isocyanate group(s). Examples of useful blocking agents are phenol, cresol, xylenol, p-ethylphenol, o-isopropylphenol, p-tert-butylphenol, p-tert-octylphenol, thymol, p-naphthol, p-nitrophenol, p-chlorophenol and like phenol compounds; methanol, ethanol, propanol, butanol, methyl cellosolve, butyl cellosolve, methyl carbitol, benzyl alcohol, phenyl cellosolve, furfuryl alcohol, cyclohexanol and like alcoholic compounds; dimethyl malonate, ethyl acetoacetate and like active methylene compounds; butyl mercaptan, thiophenol, tert-dodecyl mercaptan and like mercaptan compounds; acetanilide, acetanisidide, acetic amide, benzamide and like acid amide compounds; succinimide, maleimide and like imide compounds; diphenylamine, phenylnaphthylamine, aniline, carbazole and like amine compounds; imidazole, 2-ethylimidazole and like imidazole compounds; urea, thiourea, ethylene urea and like urea compounds; phenyl N-phenylcarbamate, 2-oxazolidone and like carbamate compounds; ethyleneimine and like imine compounds; formaldoxime, acetaldoxime, methyl ethyl ketoxime, methyl isobutyl ketoxime, cyclohexanone oxime and like oxime compounds, sodium bisulfite, potassium bisulfite and like sulfite compounds; $\epsilon$-caprolactam, $\delta$-valerolactam, $\gamma$-butyrolactam, $\beta$-propiolactam and like lactam compounds; etc. Especially preferable are phenolic, lactam, alcoholic and oxime compounds.

The reaction between the NCO-containing polymer having a polymerizable double bond and the blocking agent is conducted by admixing the blocking agent with a solution of the polymer in an organic solvent at a temperature usually of 20° to 100° C. Tin compound or like catalyst may be used when desired.

In principle, it is desired to use the blocking agent in an amount required to react with all the free isocyanate groups remaining in the NCO-containing compound having the polymerizable double bond introduced.

The amount of blocking agent to be admixed with the NCO-containing polymer in the process B is such as is needed to allow an amount of free isocyanate groups to remain in the polymer so that approximately the same amount of polymerizable double bonds as in the process A will be introduced into the polymer by the subsequent urethanation reaction of the hydroxyl-containing vinyl monomer. Most preferably, the blocking agent is used in an amount required to allow free isocyanate groups to remain in such an amount that one polymerizable double bond can be introduced into the NCO-containing polymer per molecule thereof and to completely block the other isocyanate groups.

After the blocking agent has been reacted, the hydroxyl-containing vinyl monomer is reacted with all the remaining free isocyanate groups. This reaction of the process B can be carried out in the same manner as in the process A.

The self-crosslinkable resin of the present invention is obtained by polymerizing an unsaturated monomer component consisting essentially of a hydroxyl-containing vinyl monomer with the polymerizable double bond in an organic solvent solution of the blocked isocyanate-containing polymer obtained by the process A or B and having the double bond. The resin is a self-crosslinkable vinyl polymer having in the molecule a blocked isocyanate group and a hydroxyl group which are comlementary reactive groups, and is a graft polymer comprising a polymer having a blocked isocyanate group and a polymer containing a hydroxyl group and attached thereto by a urethanation reaction.

Examples of organic solvents useful for the polymerization are aliphatic hydrocarbons such as hexane, heptane and octane; aromatic hydrocarbons such as benzene, toluene and xylene; alcohols such as methyl alcohol, isopropyl alcohol, n-butyl alcohol and isobutyl alcohol; ethers such as cellosolve and methyl cellosolve; ketones such as methyl ethyl ketone, methyl isobutyl ketone, diisobutyl ketone and ethyl butyl ketone; and esters such as ethyl acetate, isobutyl acetate and amyl acetate. These organic solvents may be used singly or in admixture.

The unsaturated monomer component consists essentially of a hydroxyl-containing vinyl monomer, which, when required, can be used in combination with a carboxyl-containing vinyl monomer and/or other vinyl monomer.

Among these, the hydroxyl-containing vinyl monomer and other vinyl monomer to be suitably used are those previously mentioned. The carboxyl-containing vinyl monomer is a compound having at least one carboxyl group and at least one radically polymerizable unsaturated bond in the molecule. Examples of such compounds are acrylic acid, methacrylic acid, crotonic acid, maleic acid, maleic anhydride, itaconic acid, itaconic anhydride, fumaric acid, citraconic acid and like $\alpha,\beta$-ethylenically unsaturated carboxylic acids.

The proportions of vinyl monomers constituting the unsaturated monomer component are not limited specifically. However, based on the whole weight of the unsaturated monomer component, the proportions are preferably 1 to 100 wt. %, more preferably 10 to 60 wt. %, of the hydroxyl-containing vinyl monomer, 0 to 50 wt. %, more preferably 0.5 to 20 wt. %, of the carboxyl-containing vinyl monomer, and 0 to 99 wt. %, more preferably 20 to 90 wt. %, of other vinyl monomer.

The polymerization of the unsaturated monomer component with the blocked isocyanate-containing polymer having the polymerizable double bond is conducted usually with use of a radical polymerization initiator. Examples of radical polymerization initiators usable are benzoyl peroxide, lauroyl peroxide, caproyl peroxide, tert-butyl peroctoate, diacetyl peroxide and like organic peroxides; azobisisobutyronitrile, azobis-$\alpha,\gamma$-dimethyl-valeronitrile, dimethyl-$\alpha,\alpha'$-azoisobutyrate and like azo catalysts; diisopropyl peroxycarbonate and like dialkyl peroxydicarbonate; and redox initiators. While the initiator can be used at a concentration of 0.01 to 15 wt. % based on the combined amount of monomers, the concentration is preferably 0.1 to 10 wt. %.

The proportion of the unsaturated monomer component to be present in the polymerization system is widely variable according to the type of the resin to be obtained. It is generally suitable to use about 5 to about 500 parts by weight, preferably 10 to 350 parts by weight, of the unsaturated monomer component per 100 parts by weight of the blocked isocyanate-containing polymer having the polymerizable double bond. Further the combined concentration of the blocked isocyanate-containing polymer having the polymerizable double bond and the unsaturated monomer component to be present in the organic solvent is generally suitably about 30 to about 70 wt. %, preferably 30 to 60 wt. %.

The polymerization can be effected in the known manner. Suitable temperature for polymerization is generally about 50° to about 100° C. but is preferably up to 75° C. because an excessively high temperature, if used for the reaction, is likely to partly dissociate the blocking agent from the blocked isocyanate group of the polymer having the polymerizable double bond, permitting a reaction between isocyanate and hydroxyl and resulting in an increased viscosity or gelation.

The resin (graft polymer) thus obtained has at least one blocked isocyanate group and at least one hydroxyl group and is about 1,000 to about 100,000, preferably about 5,000 to about 50,000, in weight average molecular weight.

When the self-crosslinkable resin of the present invention is adapted to have equal amounts of blocked isocyanate and hydroxyl in the molecule, the resin will exhibit the highest crosslinking degree when forming crosslinkable coatings, whereas it is desirable that either one of the functional groups be present in an excessive amount, for example, in view of the adhesion to the substrate or interlayer adhesion when the resin is used as a coating composition or an adhesive composition. It is suitable that the resin be about 25 to about 250 in hydroxy value (mg KOH/g) and about 15 to about 250 in isocyanate value (g/1000 g).

The polymerization reaction system of the NCO-containing monomer for preparing the NCO-containing polymer for use in the present invention is free from any polymerizable monomer or solvent having active hydrogen reactive with the isocyanate group and therefore in no way undergoes gelation. Furthermore, the blocking agent can be reacted with the NCO-containing polymer according to the invention by heating the mixture to a temperature required for the blocking agent to react with the isocyanate group. For example, phenolic or oxime blocking agents, which are prone to discoloration at high temperatures, are usable at a temperature of up to about 80° C. for blocking the isocyanate group without being heated to a high temperature and therefore cause any discoloration. Moreover, these agents dissociate at a low temperature (of up to 100° C.) and are accordingly advantageously usable for low-temperature curing. Further even if the blocking agent used has a high dissociation temperature, the agent readily reacts with the NCO-containing polymer without any likelihood of gelation. The urethanation reaction between the isocyanate group and the hydroxyl-containing vinyl monomer for introducing a polymerizable double bond into the NCO-containing polymer can also be carried out in the absence of any other functional group which will inhibit the reaction or cause a gelation reaction.

The self-crosslinkable resin of the invention thus prepared and having both blocked isocyanate and hydroxyl groups are useful for coating compositions and adhesive compositions.

For preparing coating compositions, pigments, fillers, surface conditioning agents, anti-aging agents, etc. are added to the resin to the obtain single-pack compositions. When required, other ingredients such as polyols, reactive diluents and other crosslinking agents (e.g., melamine resin, blocked isocyanates, and epoxy, acid and alkoxysilane compounds) can be incorporated into such composition. Various curing catalysts are also usable.

Examples of useful curing catalysts are tetraisopropyl titanate, tetrabutyl titanate, lithium acetate, acetylacetone iron(III), zinc 2-ethylhexonate, copper acetate, vanadium trichloride, tin octylate, dibutyltin diacetate, dibutyltin dioctoate, dibutyltin dilaurate, dibutyltin dimaleate and like metal catalysts. These metal catalysts may be used singly or in admixture. Further desirable to use are, for example, trimethylamine, triethylamine, dimethylcyclohexylamine, N-tetramethylhexane-1,6-diamine, N-pentamethyldiethylenetriamine, 2-methyl-1,4-diazabicyclo [2,2,2] octane and like tertiary amine. Especially desirable to use are tin octylate, dibutyltin dilaurate and like organotin compounds. The amount of curing catalyst to be used, which differs with the kind thereof, is usually up to about 5 wt. %.

The coating composition, adhesive composition or the like thus prepared releases isocyanate groups as regenerated from the blocked isocyanate groups when heated at a temperature of 50° to 200° C., preferably 80° to 150° C., or under the action of the curing catalyst. The regenerated isocyanate group react with hydroxyl groups to form urethane bonds, giving a three-dimensional crosslinked structure.

The resin of the present invention can be prepared by a facilitated process involving polymerization but no gelation or discoloration and yet can be made curable at low temperatures.

The present invention will be described in greater detail with reference to the following examples, which nevertheless in no way limit the invention. The parts and the percentages in the following examples and comparative examples are all by weight.

EXAMPLE 1

Preparation of Prepolymer

Xylene (65 parts) was placed into a reactor equipped with a stirrer, reflux condenser and thermometer and was heated to and maintained at 110° C. A mixture of 40 parts of 2-isocyanate ethyl methacrylate, 15 parts of styrene, 30 parts of n-butyl methacrylate, 15 parts of 2-ethylhexyl methacrylate and 2.5 parts of azobisisobutyronitrile was added dropwise to the xylene over a period of 3 hours.

Subsequently, a mixture of 35 parts of xylene and 0.5 part of azobisisobutyronitrile was added dropwise to the resulting mixture over a period of 1 hour, followed by aging for 1 hour. The reaction mixture will be referred to as "prepolymer solution A."

The resin solution obtained had a nonvolatile content of 50% and was a transparent liquid, which was D in Gardner viscosity (25° C.). The resin was about 9,000 in weight average molecular weight.

Introduction of Polymerizable Double Bond

Prepolymer solution A was heated to and maintained at 80° C., and 1.3 parts of 2-hydroxyethyl acrylate was added to the solution with stirring. The mixture was aged for 1 hour and thereafter cooled to 40° C. Methyl ethyl ketoxime (21.5 parts) was added dropwise to the mixture over a period of 15 minutes, followed by aging for 1 hour. The reaction mixture will be referred to as "prepolymer solution A1."

Preparation of Graft Polymer

Xylene (70 parts) was placed into a reactor equipped with a stirrer, reflux condenser and thermometer and was heated to and maintained at 70° C. A mixture of 32.1 parts of n-butyl methacrylate, 20 parts of styrene, 15 parts of 2-ethylhexyl methacrylate, 29.9 parts of 2-hydroxyethyl acrylate, 3 parts of acrylic acid, 219.8 parts of prepolymer solution A1 and 4 parts of 2,2'-azobis(2,4-dimethylvaleronitrile) was added dropwise to the xylene over a period of 3 hours.

Subsequently, a mixture of 30 parts of xylene and 0.5 part of 2,2'-azobis(2,4-dimethylvaleronitrile) was added dropwise to the resulting mixture over a period of 1 hour, followed by aging for 1 hour. The reaction mixture will be referred to as "graft polymer solution A."

The resin solution obtained was a slightly yellowish transparent liquid and had a nonvolatile content of 47%. The polymerization conversion determined from this nonvolatile content was 98.7%. The solution was S in Gardner viscosity and exhibited no increase in viscosity even after having been stored at 30° C. for 1 month. The resin obtained was 144.6 mg KOH/g resin in hydroxy value, 108.3 g/1,000 g resin in isocyanate value and about 18,000 in weight average molecular weight.

EXAMPLE 2

To graft polymer solution A was added 0.5 phr (per hundred parts of resin, the same as hereinafter) of dibutyltin dilaurate based on the solids of the solution, whereas the solution exhibited satisfactory storage stability.

EXAMPLE 3

Preparation of Prepolymer

Xylene (65 parts) was placed into a reactor equipped with a stirrer, reflux condenser and thermometer and was heated to and maintained at 130° C. A mixture of 50 parts of m-isopropenyl-α,α'-dimethylbenzyl isocyanate, 30 parts of n-butyl acrylate, 20 parts of 2-ethylhexyl acrylate and 4 parts of tert-butyl peroxyisopropyl carbonate was added dropwise to the xylene over a period of 3 hours. Subsequently, a mixture of 35 parts of xylene and 1.0 part of tert-butyl peroxyisopropyl carbonate was added dropwise to the resulting mixture over a period of 1 hour, followed by aging for 1 hour. The reaction mixture will be referred to as "prepolymer solution B." The resin solution obtained had a nonvolatile content of 50% and was a transparent liquid, which was D in Gardner viscosity (25° C.). The resin was about 10,000 in weight average molecular weight.

Introduction of Polymerizable Double Bond

Prepolymer solution B was heated to and maintained at 80° C., and 1 part of 2-hydroxyethyl acrylate was added to the solution with stirring. The mixture was aged for 1 hour and thereafter cooled to 40° C. Methyl ethyl ketoxime (21.5 parts) was added dropwise to the mixture over a period of 15 minutes, followed by aging for 1 hour. The reaction mixture will be referred to as "prepolymer solution B1."

Preparation of Graft Polymer

Xylene (70 parts) was placed into a reactor equipped with a stirrer, reflux condenser and thermometer and was heated to and maintained at 70° C. A mixture of 29.7 Parts of n-butyl methacrylate, 20 parts of styrene, 15 parts of 2-ethylhexyl methacrylate, 32.3 parts of 2-hydroxyethyl methacrylate, 3 parts of acrylic acid, 219.8 parts of prepolymer solution B1 and 4 parts of 2,2'-azobis(2,4-dimethylvaleronitrile) was added dropwise to the xylene over a period of 3 hours. Subsequently, a mixture of 30 parts of xylene and 0.5 part of 2,2'-azobis(2,4-dimethylvaleronitrile) was added dropwise to the resulting mixture over a period of 1 hour, followed by aging for 1 hour. The reaction mixture will be referred to as "graft polymer solution B."

The resin solution obtained was a slightly yellowish transparent liquid and had a nonvolatile content of 46.8%. The polymerization conversion determined from this nonvolatile content was 96.6%. The solution was S in Gardner viscosity and exhibited no increase in viscosity even after having been stored at 30° C. for 1 month. The resin obtained Was 139.6 mg KOH/g resin in hydroxy value, 104.5 g/1,000 g resin in isocyanate value and about 20,000 in weight average molecular weight.

EXAMPLE 4

To graft polymer solution B was added 0.5 phr of dibutyltin dilaurate based on the solids of the solution, whereas the solution exhibited satisfactory storage stability.

EXAMPLE 5

Preparation of Prepolymer

Xylene (65 parts) was placed into a reactor equipped with a stirrer, reflux condenser and thermometer and was heated to and maintained at 110° C. A mixture of 45 parts of equimolar adduct of isophorone diisocyanate/2-hydroxyethyl acrylate, 15 parts of styrene, 25 parts n-butyl mechacrylate, 15 parts of 2-ethylhexyl methacrylate and 2.5 parts of azobisisobutyronitrile was added dropwise to the xylene over a period of 3 hours.

Subsequently, a mixture of 35 parts of xylene and 0.5 part of azobisisobutyronitrile was added dropwise to the resulting mixture over a period of 1 hour, followed by aging for 1 hour. The reaction mixture will be referred to as "prepolymer solution C." The resin solution obtained had a nonvolatile content of 50% and was a transparent liquid, which was F in Gardner viscosity (25° C.). The resin was about 10,000 in weight average molecular weight.

Introduction of Polymerizable Double Bond

Prepolymer solution C was heated to and maintained at 80° C., and 1 part of 2-hydroxyethyl methacrylate was added to the solution with stirring. The mixture was aged for 1 hour and thereafter cooled to 40° C. Methyl isobutyl ketoxime (11.6 parts) was added dropwise to the mixture over a period of 15 minutes, followed by aging for 1 hour. The reaction mixture will be referred to as "prepolymer solution C1."

Preparation of Graft Polymer

Xylene (70 parts) was placed into a reactor equipped with a stirrer, reflux condenser and thermometer and was heated to and maintained at 70° C. A mixture of 46.6 parts of n-butyl methacrylate, 20 parts of styrene, 15 parts of 2-ethylhexyl methacrylate, 15.4 parts of 2-hydroxyethyl acrylate, 3 parts of acrylic acid, 200 parts of prepolymer solution C1 and 4 parts of 2,2'-azobis(2,4-dimethylvaleronitrile) was added dropwise to the xylene over a period of 3 hours. Subsequently, a mixture of 30 parts of xylene and 0.5 part of 2,2'-azobis(2,4-dimethylvaleronitrile) was added dropwise to the resulting mixture over a period of 1 hour, followed by aging for 1 hour. The reaction mixture will be referred to as "graft polymer solution C."

The resin solution obtained was a slightly yellowish transparent liquid was T in Gardner viscosity and exhibited no increase in viscosity even after having been stored at 30° C. for 1 month. The resin obtained was 74.6 mg KOH/g resin in hydroxy value, 55.9 g/1,000 g resin in isocyanate value and about 20,000 in weight average molecular weight.

EXAMPLE 6

To graft polymer solution C was added 0.5 phr of dibutyltin dilaurate based on the solids of the solution, whereas the solution exhibited satisfactory storage stability. cl EXAMPLE 7

Introduction of Polymerizable Double Bond

Prepolymer solution A obtained in Example 1 was maintained at a temperature of 40° C., and 19.5 parts of methyl ethyl ketoxime was added dropwise to the solution with stirring over a period of 30 minutes, followed by aging for 2 hours. 2-Hydroxyethyl acrylate (1.3 parts) was thereafter added to the mixture, followed by aging at 70° C. for 2.5 hours, and 2 parts of methyl ethyl ketoxime was subsequently added to the mixture. The resulting reaction mixture will be referred to as "prepolymer solution A2."

Preparation of Graft Polymer

A graft polymer was prepared in the same manner as in Example 1 with the exception of using prepolymer solution A2. The reaction mixture obtained will be referred to as "graft polymer solution A2."

EXAMPLE 8

To graft polymer solution A2 was added 0.5 phr of dibutyltin dilaurate, whereas the solution exhibited high storage stability.

EXAMPLE 9

Introduction of Polymerizable Double Bond

Prepolymer solution B obtained in Example 3 was maintained at a temperature of 40° C., and 19.5 parts of methyl ethyl ketoxime was added dropwise to the solution with stirring over a period of 30 minutes, followed by aging for 2 hours. 2-Hydroxyethyl acrylate (1 part) was thereafter added to the mixture, followed by aging at 70° C. for 2.5 hours, and 2 parts of methyl ethyl ketoxime was subsequently added to the mixture. The resulting reaction mixture will be referred to as "prepolymer solution B2."

Preparation of Graft Polymer

A graft polymer was prepared in the same manner as in Example 3 with the exception of using prepolymer solution B2. The reaction mixture obtained will be referred to as "graft polymer solution B2."

EXAMPLE 10

To graft polymer solution B2 was added 0.5 phr of dibutyltin dilaurate, whereas the solution exhibited high storage stability.

EXAMPLE 11

Introduction of Polymerizable Double Bond

Prepolymer solution C obtained in Example 5 was maitained at a temperature of 40° C., and 10.6 parts of methylisobutylketoxime was added dropwise to the solution with stirring over a period of 30 minutes, followed by aging for 2 hours. 2-Hydroxyethyl acrylate (1 part) was thereafter added to the mixture, followed by aging at 70° C. for 2.5 hours, and 1 part of methylisobutylketoxime was subsequently added to the mixture. The resulting reaction mixture will be refferred to as "prepolymer solution C2."

Preparation of Graft Polymer

A graft polymer was prepared in the same manner as in Example 5 with the exception of using prepolymer solution C2. The reaction mixture obtained will be referred to as "graft polymer solution C2."

EXAMPLE 12

To graft polymer solution C2 was added 0.5 phr of dibutyltin dilaurate, whereas the solution exhibited high storage stability.

COMPARATIVE EXAMPLE 1

Xylene (70 parts) was placed into a reactor equipped with a stirrer, reflux condenser and thermometer and was heated to and maintained at 70° C. A mixture of 20 parts of 2-isocyanate ethyl methacrylate, 15 parts of styrene, 29.9 parts of 2-hydroxyethyl acrylate, 20.1 parts of n-butyl methacrylate, 15 parts of 2-ethylhexyl methacrylate and 2.5 parts of azobisisobutyronitrile was added dropwise to the xylene over a period of 3 hours for polymerization, but the mixture gelled 30 minutes after the start of the dropwise addition.

COMPARATIVE EXAMPLE 2

Xylene (70 parts) was placed into a reactor equipped with a stirrer, reflux condenser and thermometer and was heated to and maintained at 70° C. A mixture of 50 parts of m-isopropenyl-$\alpha,\alpha'$-dimethylbenzyl isocyanate, 10 parts of n-butyl methacrylate, 32.3 parts of 2-hydroxyethyl methacrylate, 7.7 parts of 2-ethylhexyl methacrylate and 4 parts of $\alpha,\alpha'$-azobisisobutyronitrile was added dropwise to the xylene over a period of 3 hours for polymerization, but the mixture gelled 60 minutes after the start of the dropwise addition.

COMPARATIVE EXAMPLE 3

Xylene (70 parts) was placed into a reactor equipped with a stirrer, reflux condenser and thermometer and was heated to and maintained at 70° C. A mixture of 45 parts of equimolar adduct of isophorone diisocyanate/2-hydroxyethyl acrylate, 15 parts of styrene, 15.4 parts of 2-hydroxyethyl acrylate, 14.6 parts of n-butyl methacrylate, 10 parts of 2-ethylhexyl methacrylate and 2.5 parts of azobisisobutyronitrile was added dropwise to the xylene over a period of 3 hours for polymerization, but the mixture gelled 40 minutes after the start of the dropwise addition.

COMPARATIVE EXAMPLE 4

In the same manner as in Comparative Example 1, 70 parts of xylene was placed into a reactor, and heated to and maintained at 80° C. A mixture of 20 parts of 2-isocyanate ethyl methacrylate having its isocyanate blocked with phenol, 15 parts of styrene, 29.9 parts of 2-hydroxyethyl acrylate, 20.1 parts of n-butyl methacrylate, 15 parts of 2-ethylhexyl methacrylate and 2.5 parts of $\alpha,\alpha'$-azobisisobutyronitrile was added dropwise to the xylene over a period of 3 hours. A mixture of 30 parts of xylene and 0.5 part of $\alpha,\alpha'$-azobisisobutyronitrile was then added dropwise to the mixture over a period of 1 hour, followed by aging for 1 hour. The resin solution obtained had a nonvolatile content of 56% and was a liquid colored brown. The polymerization efficiency calculated from the nonvolatile content was 96%. The resin was about 22,000 in weight average molecular weight.

To 100 parts of the solution was added 0.5 phr of dibutyltin dilaurate based on the solids thereof. The resulting solution exhibited satisfactory storage stability.

COMPARATIVE EXAMPLE 5

In the same manner as in Comparative Example 2, 70 parts of xylene was placed into a reactor equipped with a stirrer, reflux condenser and thermometer, and heated to and maintained at 100° C. A mixture of 15 parts of m-isopropenyl-$\alpha,\alpha'$-dimethylbenzyl isocyanate as blocked with methyl ethyl ketoxime, 10 parts of styrene, 35 parts of n-butyl methacrylate, 30 parts of 2-hydroxyethyl methacrylate, 10 parts of 2-ethylhexyl methacrylate and 4 parts of tert-butyl peroxyisopropyl carbonate was added dropwise to the xylene over a period of 5 hour. A mixture of 35 parts of xylene and 1.0 part of tert-butyl peroxyisopropyl carbonate was then added dropwise to the mixture over a period of 1 hour, followed by aging for 1 hour. The resin solution obtained had a non-volatile content of 45% and was a liquid colored yellowish brown. The polymerization efficiency calculated from the nonvolatile content was 90%. The resin was about 25,000 in weight average molecular weight.

To 100 parts of the solution was added 0.5 phr of dibutyltin dilaurate based on the solids thereof. The resulting solution exhibited satisfactory storage stability.

Each of the solutions obtained in Examples 1 to 12 and Comparative Examples 4 and 5 was applied to tinplate to a dry thickness of about 50 μm, baked at 130° C. or 150° C. for 30 minutes and then checked for gel fraction ratio. The gel fraction ratio was determined from an extract obtained by treating the coating at a reflux temperature using acetone for 7 hours.

A white overcoat aminoalkyd resin composition incorporating titanium white and prepared for motor vehicles was applied to tinplate to a thickness of 40 μm and baked at 140° C. for 30 minutes to prepare substrate specimens. Each of the solutions obtained in Examples 1 to 12 and Comparative Examples 4 and 5 was applied to the specimen to a dry thickness of 50 μm and baked at 160° C. for 30 minutes. The coating was then checked for yellowing in terms of the Δb value determined by a color-difference meter.

Table 1 shows the results including the storage stability of the solutions previously mentioned.

| | Example | | | | | | | | | | | | Comp. Ex. | |
|---|---|---|---|---|---|---|---|---|---|---|---|---|---|---|
| | 1 | 2 | 3 | 4 | 5 | 6 | 7 | 8 | 9 | 10 | 11 | 12 | 4 | 5 |
| Curing catalyst 1) | None | 0.5 | None | 0.5 | None | 0.5 | None | 0.5 | None | 0.5 | None | 0.5 | 0.5 | 0.5 |
| Storage stability 2) | Good | Good | Good | Good | Good | Good | Good | Good | Good | Good | Good | Good | Good | Good |
| Gel fraction ratio 3) | 52/87 | 73/94 | 86/94 | 96/98 | 53/89 | 80/93 | 53/88 | 72/95 | 86/92 | 97/98 | 55/90 | 82/94 | 73/93 | 79/85 |
| Yellowing 4) | 0.4 | 0.6 | 0.3 | 0.5 | 0.6 | 0.8 | 0.4 | 0.6 | 0.3 | 0.5 | 0.6 | 0.8 | 3.6 | 3.4 |

1) 0.5 phr of dibutyltin dilaurate.
2) When the viscosity increase resulting from storage at 30° C. for one month was not greater than two reference increments of Gardner viscosity, the result was interpreted as being "good."
3) The values (%) given to the left and to the right of the slash are those obtained for samples baked at 130° C. and 150° C., respectively.
4) The Δb value of the coating was measured based on the substrate specimen. The value, when not greater than 0.8, was interpreted as being acceptable.

I claim:

1. A self-crosslinkable resin characterized in that the resin is prepared by providing a hydroxyl-containing vinyl monomer and a vinyl polymer having at least two isocyanate groups in skeleton of the vinyl polymer molecule, reacting the hydroxyl-containing vinyl monomer with some isocyanate groups on the skeleton of the vinyl polymer to introduce a polymerizable double bond into the polymer, subsequently completely blocking the isocyanate groups(s) remaining on the polymer skeleton with a blocking agent, and thereafter polymerizing an unsaturated monomer component containing a hydroxyl-containing vinyl monomer with the polymerizable double bond introduced into the polymer.

2. A resin as defined in claim 1, wherein the hydroxyl-containing vinyl monomer of the unsaturated monomer component reacted with the vinyl polymer is used in an amount corresponding to at least 0.1 polymerizable double bond per molecule having a weight average molecular weight of abut 500 to abut 50,000.

3. A resin as defined in claim 1 wherein the unsaturated monomer component is used in a ratio of about 5 to about 500 parts by weight per 100 parts by weight of the polymer containing the blocked isocyanate group and having the polymerizable double bond.

4. A resin as defined in claim 1 which has at least one blocked isocyanate group and at least one hydroxyl group and is about 1,000 to about 100,000 in weight average molecular weight.

5. A resin as defined in claim 1 which is about 25 to about 250 mg KOH/g in hydroxy value and about 15 to about 250 g/1000 g in isocyanate value.

6. A self-crosslinkable resin characterized in that the resin is prepared by blocking some isocyanate groups on the skeleton of a vinyl polymer having at least two isocyanate groups in the molecule with a blocking agent, subsequently reacting a hydroxyl-containing vinyl monomer with the isocyanate group(s) remaining on the polymer skeleton to introduce a polymerizable double bond into the polymer, and thereafter polymerizing an unsaturated monomer component consisting essentially of a hydroxyl-containing vinyl monomer with the polymerizable double bond introduced.

7. A resin as defined in claim 6 wherein the unsaturated monomer component is used in a ratio of about 5 to about 500 parts by weight per 100 parts by weight of the polymer containing the blocked isocyanate group and having the polymerizable double bond.

8. A resin as defined in claim 6 which has at least one blocked isocyanate group and at least one hydroxyl group and is about 1,000 to about 100,000 in weight average molecular weight.

9. A resin as defined in claim 6 which is about 25 to about 250 mg KOH/g in hydroxy value and about 15 to about 250 g/1000 g in isocyanate value.

* * * * *